July 23, 1968

H. SORKIN 3,394,115

TRIFLUOROETHOXYETHYL ACRYLATE AND POLYMERS THEREOF

Filed March 24, 1965

INVENTOR
HOWARD SORKIN
BY
Riggs T. Stewart
ATTORNEY

United States Patent Office 3,394,115
Patented July 23, 1968

3,394,115
TRIFLUOROETHOXYETHYL ACRYLATE AND POLYMERS THEREOF
Howard Sorkin, Berkeley Heights, N.J., assignor to Air Reduction Company, Incorporated, New York, N.Y., a corporation of New York
Filed Mar. 24, 1965, Ser. No. 442,357
2 Claims. (Cl. 260—89.5)

ABSTRACT OF THE DISCLOSURE

Trifluoroethoxy ethyl acrylate having the formula

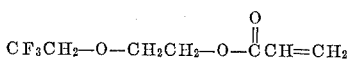

Figure 1:
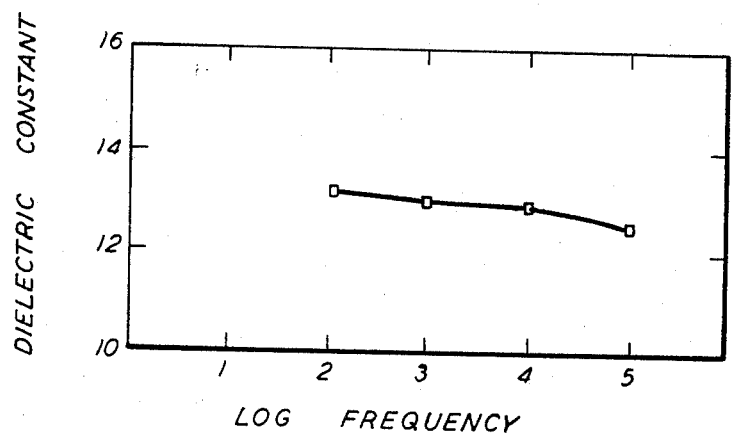

is produced by reacting triflouroethoxy ethanol with acrylyl chloride. This compound can be polymerized to a polymeric composition having in its polymeric structure a moiety of the general formula

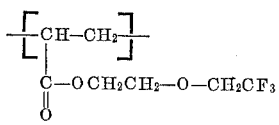

---

This invention relates to a novel unsaturated compound, to a method for producing the same, and to polymeric compositions prepared therefrom.

For many electrical uses there is a need for polymers having relatively high dielectric constants. The number of known polymers meeting this requirement, however, is relatively small.

It is an object of this invention to provide a polymerizable monomer which can be polymerized to form polymers having desirable dielectric constant values.

It is a further object of the invention to provide polymers having high dielectric constants.

In accordance with this invention there is provided a novel monomer, viz. trifluoroethoxy ethyl acrylate.

The monomeric compound of this invention can be represented by the formula

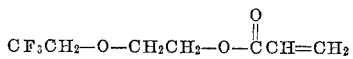

This compound is polymerizable and can be used to form polymers characterized by high dielectric constants.

While other acrylates are known, and while they have been polymerized to form polymeric compositions, it has been discovered that trifluoroethoxy ethyl acrylate not only is polymerizable to form polymeric compositions which are useful as coatings, impregnants, and for similar purposes, but that these polymers have a relatively high dielectric constant and the unusual property of retaining this high dielectric constant substantially unchanged over a wide frequency range. This makes these polymers particularly useful as impregnants in capacitors. In general, polymers of trifluoroethoxy ethyl acrylate have dielectric constants of at least 12, and the dielectric constant remains little changed at frequencies ranging from 100 to 100,000 cycles per second, i.e. these polymers exhibit essentially no dispersion in this frequency range. Consequently, they are of particular value for applications in capacitors operating in the audio frequency range.

In general, the trifluoroethoxy ethyl acrylate of this invention can be formed by the action of acrylyl chloride upon trifluoroethoxy ethanol. The reaction of the trifluoroethoxy ethanol with the acrylyl chloride is suitably carried out in an inert solvent, such as a hydrocarbon solvent which is liquid at room temperature, e.g. benzene, toluene, xylene, or like aromatic solvent, or an aliphatic hydrocarbon solvent such as pentane, hexane, or the like, and in the presence of an HCl acceptor such as a tertiary amine, e.g. pyridine, picoline, triethyl amine, and the like. Also suitable are other inert solvents which are liquid at room temperature, such as ethers, e.g. dioxane, tetrahydrofuran, and the like. More than one solvent may also be employed, and one of the reactants may be dissolved in one of the solvents and the other reactant may be dissolved in the other solvent prior to being mixed together in the reaction zone. The reaction is suitably carried out at room temperature at atmospheric pressure but higher or lower temperatures, e.g. temperatures of 0 to 100° C. and higher or lower pressures can be employed, if desired. The reaction is suitably carried out by gradually adding one of the reactants to the other, preferably by the dropwise addition of a solution of the trifluoroethoxy ethanol to a solution of the acrylyl chloride.

The trifluoroethoxy ethyl acrylate of this invention has been found to have a boiling point of 68–70° C. at 1.5 mm. Hg.

Trifluoroethoxy ethanol, from which the trifluoroethoxy ethyl acrylate is prepared, is suitably obtained by the action of ethylene oxide upon trifluoroethanol and is described, for example, in J. Am. Chem. Soc. 79, 6533 (1957). The following examples, which are given for illustrative purposes only, serve to show the preparation of the trifluoroethoxy ethyl acrylate of this invention, and its polymerization.

EXAMPLE 1.—PREPARATION OF
$CF_3CH_2$—O—$CH_2CH_2OH$

An autoclave was charged with 200 g. trifluoroethanol and 5 g. KOH. After sealing and purging with nitrogen, 110 ml. liquid ethylene oxide was admitted and the mixture heated at 70° C. for 7 hours. Fractional distillation yielded 145 g. $CF_3CH_2OCH_2CH_2OH$ boiling at 78–79°/54 mm., $n_D^{20}$ 1.3505. A higher boiling fraction, 91–92°/4.5 mm., $n_D^{20}$ 1.3821, was also obtained (95.6 g.). This proved to be the product of the addition of 2 molecules of ethylene oxide to trifluoroethanol ($CF_3CH_2$—O—$CH_2CH_2$—O—$CH_2CH_2OH$)

EXAMPLE 2.—PREPARATION OF

A solution of 144 g. $CF_3CH_2$—O—$CH_2CH_2OH$ in 100 cc. pyridine was added dropwise, with stirring, to a solution of 91.4 g. acrylyl chloride in 100 cc. benzene. Water (200 cc.) was slowly added after 3 hours to form a 2-phase mixture. The organic phase was separated, washed with water, and dried over magnesium sulfate. Fractional distillation of the organic phase yielded 27 g. trifluoroethoxy ethyl acrylate, boiling at 68–70°/1.5 mm.

The polymers of trifluoroethoxy ethyl acrylate are characterized by the moiety illustrated below:

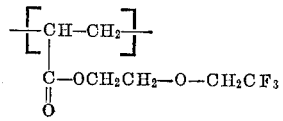

The vinyl groups in the polymer are bonded to other similar or dissimilar moieties, depending on whether the material has been homo- or co-polymerized.

The vinyl radical in these compounds permits the incorporation of the molecule into polymeric materials by either a direct polymerization reaction or by a graft polymerization technique (on an already formed polymer). The polymerization conditions suitably utilized in forming the resinous compounds containing the monomers of this invention are conventional. The polymerization reaction can be effected either in solution, in emulsion using either a bulk or mass polymerization in the absence of a non-reactive solvent, or a dispersing medium. Suitable solvents include benzene, toluene, tetrahydrofuran, and the like. Usually a polymerization initiator is employed and the reaction is heated to accelerate polymerization. The techniques customarily used in polymerizing vinyl monomers are satisfactory for the polymerization of the monomers of this invention. Temperatures of polymerization are those used in vinyl polymer formation, e.g. 30 to 100° C. Polymerization initiators or catalysts include the so-called peroxy catalysts, such as benzoyl peroxide, lauroyl peroxide, tertiary alkyl peroxides, di(tertiary alkyl) peroxides; alkali-metal persulfates such as potassium persulfate; and other polymerization catalysts such as azo-bis-(isobutyronitrile). The amount of catalyst will depend on the polymerization rate desired and on the temperature of polymerization. In general, the amount of catalyst is 0.1 to 1% based on the weight of the monomer.

EXAMPLE 3.—POLYMERIZATION OF

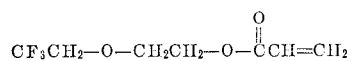

A solution of 20 g.

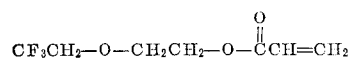

and 0.1 g. azo-bis-iso butyronitrile in 30 cc. benzene was refluxed for 2 hours. The solution was evaporated on a Teflon-coated tray and a tacky polymer which was poly(trifluoroethoxy ethyl acrylate) remained on the tray. The polymer was dissolved in acetone and then precipitated in hexane. It was dried overnight at 50° C. in a vacuum oven.

The dielectric constant (E′) and the dissipation factor (tangent $\sigma$) of the polymer produced in Example 3, were determined over the frequency range of 100 to 100,000 cycles per second. The results of these determinations are set forth in the table blow:

100 frequency:
  E′ _____ 13.17
  Tan $\sigma$ _____ 0.094
1000 frequency:
  E′ _____ 12.97
  Tan $\sigma$ _____ 0.015
10,000 frequency:
  E′ _____ 12.97
  Tan $\sigma$ _____ 0.015
100,000 frequency:
  E′ _____ 12.50
  Tan $\sigma$ _____ 0.057

Figure 2:
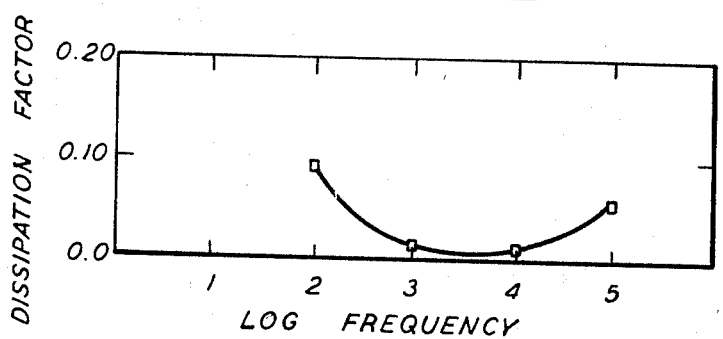

These results are plotted in the accompanying drawing wherein FIG. 1 is a chart of the dielectric constant plotted against the logarithm of the frequency, and FIG. 2 is a chart of the dissipation factor plotted against the logarithm of the frequency. It will be noted that the dielectric constant remains surprisingly uniform at the desired high level throughout the frequency range at which it was measured, and that the dissipation factor is at a desirable low value throughout the frequency range. Further measurements at 50 cycles showed the polymer to have essentially the same dielectric constant (13.16) at this frequency as it has at 100 cycles.

It will be understood that various changes and modifications may be made in the subject matter described above and illustrated in the drawing without departing from the invention, as defined in the appended claims. For example, the preparation of trifluoroethoxy ethyl acrylate is not limited to the process described above, and variations such as are practiced in the art of preparing acrylates may be employed.

It is intended, therefore, that all matter contained in the foregoing description and in the drawing shall be interpreted as illustrative only and not as limitative of the invention.

I claim:
1. Trifluoroethoxy ethyl acrylate having the formula

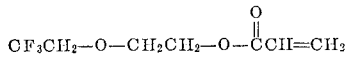

2. A polymeric composition having in its polymeric structure a moiety of the following general formula

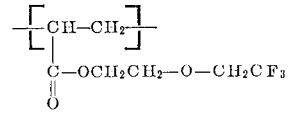

References Cited

UNITED STATES PATENTS

| | | | |
|---|---|---|---|
| 2,129,663 | 9/1938 | Barrett | 260—486 |
| 2,732,370 | 1/1956 | Codding | 260—91.1 |
| 3,177,187 | 4/1965 | Hollander et al. | 260—486 |

JOSEPH L. SCHOFER, *Primary Examiner.*

H. WONG, *Assistant Examiner.*